June 22, 1943.  F. C. OWEN  2,322,709
WELDING APPARATUS
Filed Jan. 13, 1939
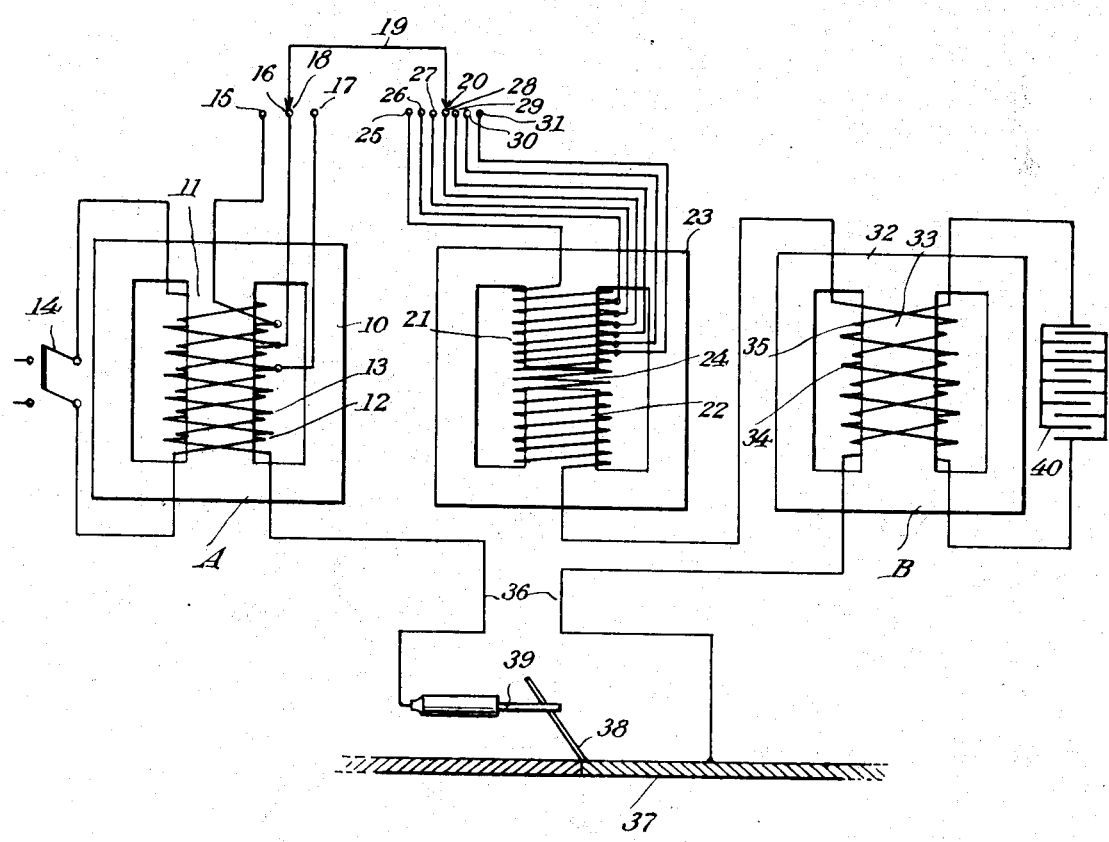
Frederick C. Owen
INVENTOR
ATTORNEY Patented June 22, 1943

2,322,709

UNITED STATES PATENT OFFICE 2,322,709

WELDING APPARATUS

Frederick C. Owen, Fayetteville, N. C.

Application January 13, 1939, Serial No. 250,832

1 Claim. (Cl. 219—8)

The object of the invention is to provide a welding apparatus susceptible of all the functions of the welding transformer disclosed in application No. 79,367, filed May 12, 1936 by the applicant herein and with the same efficiency; to provide a welding apparatus in which the parts may be housed in a metallic case without the likelihood of heating the latter from eddy currents produced by stray magnetic fields; and to provide apparatus of the kind indicated which is reduced to its most effective form for the varied character of work encountered in welding operations of all kinds with various metals.

With this object in view, the invention consists in a construction and combination of parts of which a preferred embodiment is illustrated in the accompanying drawing but to which the invention is not to be restricted. Practical application may dictate certain changes or alterations and the right is claimed to make any which fall within the spirit of the invention.

The figure is a diagrammatic view of improved apparatus constituting the invention.

The welding apparatus disclosed in the drawing comprises a main transformer A, an auxiliary transformer B with a reactor included in the connections between them.

The main transformer A embodies a core 10 of the closed magnetic circuit type on the center leg 11 of which the primary winding 12 and secondary winding 13 are wound, the leads of the primary winding being brought to a control switch 14 by which the main transformer may be connected to a supply line.

The secondary winding 13 is tapped, as indicated at 15, 16 and 17, in order to provide for varying the secondary voltage, said taps being selectively engageable with a movable contact 18 connected by a conductor 19 with a similar contact 20 by means of which the effective inductance of the reactance coil 21 may be varied.

The reactance coil 21 is carried on the center leg 22 of a core 23, likewise of the closed magnetic circuit type but the center leg is split transversely, as indicated at 24, to provide an air gap which, however, is bridged by the inductance coil 21, the latter being completely wound around the leg 22 and the air gap 24 being formed at the longitudinal center of the leg. The inductance coil 21 is tapped, as indicated at 26, 27, 28, 29, 30 and 31, and the movable contact 20 is engageable with any one of these contacts or with the terminal contact 25, so that any desired increment of inductance or the entire inductance may be included in circuit.

The auxiliary transformer B is similar to the main transformer A and includes a core 32 on the center leg 33 of which are wound the primary 34 and secondary 35, one terminal of the primary being connected to the terminal of the inductance coil 21 remote from the terminal 25 and the remaining terminal being connected to one of the welding leads 36 of which the other welding lead is connected to the secondary 13 of the main transformer A.

In the welding operation, one of the welding leads is connected to the work 37 and the other to the electrode 38 through the electrode holder 39.

The secondary 35 of the auxiliary transformer is connected to a capacitance 40 in the form of a bank of condensers. The auxiliary transformer B is of the step-up type which makes possible the use of capacitors at the most economical voltage and at the same time without danger to the operator.

The welding current for different kinds of work can be varied by the proper use of the movable contacts 18 and 20 which may be incorporated, if desired, in tap changing switches.

With the improved apparatus the arc is smooth, easy to strike and maintain and is practically unaffected by wet work or moisture. The electrical efficiency is high during the welding operation and, during idling periods, the charging current is practically nil.

Oscillograph records made of the apparatus show the current wave to be a sine wave while the voltage wave is unusually flat and smooth for a welding arc with very few and comparatively small peaks at points indicating the instants of ignition of the arc. The oscillograms also indicate that there are present voltages of very high frequencies that are harmonics of the frequencies of the exciting voltage. These high frequency voltages make for smoothness of the arc and ease of operation of the welder.

While the apparatus herein disclosed obtains unanticipated or unexpected results with the easy-to-weld metals, such as wrought iron and steel, its outstanding accomplishment is the results obtained on such metals as cast iron, brass, aluminum and stainless steel. Good sound machineable welds can be made with cast iron with less preparation and trouble than heretofore experienced and the amount of preheating can also be greatly reduced. Yellow brass or brass with a high zinc content can be welded effectively with a metallic arc, as can also aluminum, and all this with a minimum of preheating. And the same results can be accomplished with stainless steel.

The invention having been described, what is claimed as new and useful is:

Welding apparatus comprising a main transformer having a core providing a closed magnetic circuit and closely coupled primary and secondary windings thereon, an auxiliary transformer having a core likewise providing a closed magnetic circuit and closely coupled primary and secondary windings thereon, a capacitance connected across the secondary of the auxiliary transformer, and a reactor having a core providing a closed magnetic circuit interrupted with an air gap and a winding mounted on the core and bridging the air gap, the secondary of the main transformer, the winding of the reactor and the primary of the auxiliary transformer being serially connected and in series with welding leads.

FREDERICK C. OWEN.